US006886546B1

(12) United States Patent
Bircann et al.

(10) Patent No.: US 6,886,546 B1
(45) Date of Patent: May 3, 2005

(54) ROTARY-ACTUATOR EGR VALVE HAVING COMPLIANT SEAL/BUSHING

(75) Inventors: Raul A. Bircann, Penfield, NY (US); Jerry L. Kelly, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/949,506

(22) Filed: Sep. 24, 2004

(51) Int. Cl.[7] ........................ F02M 25/07; F16K 31/524

(52) U.S. Cl. ............................. 123/568.23; 251/129.11; 251/251; 251/228

(58) Field of Search ........................ 123/568.11, 568.21, 123/568.23; 251/129.11, 251, 214, 228, 298

(56) References Cited

U.S. PATENT DOCUMENTS 6,039,034 A * 3/2000 Field et al. ............ 123/568.23
6,443,135 B1 * 9/2002 Dismon et al. ........ 123/568.23
6,497,226 B2 * 12/2002 Bircann et al. ........ 123/568.21
6,749,174 B2 * 6/2004 Bircann et al. ........ 251/129.15

* cited by examiner

*Primary Examiner*—Henry C. Yuen
*Assistant Examiner*—Arnold Castro
(74) *Attorney, Agent, or Firm*—Jimmy L. Funke

(57) ABSTRACT

A rotary arm-actuated pintle valve assembly having a pintle valve seat, a pintle shaft, and a valve head forming a pintle valve for regulating flow of gas through a valve body. The shaft extends through a port in a wall of the body. A rotary-arm actuator mounted to the body includes an oscillating motor and shaft. An arm mounted on the motor shaft engages the outer end of the pintle shaft and causes the pintle shaft to reciprocate to open and close the valve. The port permits the pintle to move back and forth radially during actuation of the valve. A floating bearing assembly at the port receives the pintle and slides back and forth as directed by the pintle, all the while maintaining a pneumatic seal around the pintle. A centering element is provided within the valve body to guide the pintle in mating the head with the seat.

11 Claims, 7 Drawing Sheets

ROTARY-ACTUATOR EGR VALVE HAVING COMPLIANT SEAL/BUSHING

TECHNICAL FIELD

The present invention relates to pintle valves; more particularly, to exhaust gas recirculation (EGR) pintle valves for internal combustion engines; and most particularly, to an EGR valve having a rotary actuator wherein a compliant seal/bushing reduces hysteresis and shaft or bearing wear from parasitic radial forces.

BACKGROUND OF THE INVENTION

Pintle valves are well known for use in controlling flow of fluids, and especially gases. For example, the recirculation of a portion of the exhaust stream of an internal combustion engine into the intake manifold thereof is typically accomplished via a pintle valve. Such pintle valves are known to be actuated by linearly-acting solenoids, linear stepper motors, or motor-driven rotary arms. In the past, solenoid-driven and stepper motor-driven valves have predominated in the automotive art. However, motor-driven rotary arm valves are becoming more common at present because of inherently higher force capabilities.

In a solenoid-driven or linear stepper motor-driven valve, the pintle is subjected to actuating forces which are exclusively axial. In a rotary arm-driven valve, however, the pintle is subjected to both axial and radial force vectors over most of the travel path of the arm. It is known that radial vectors can cause unwanted wear of a pintle shaft and/or a seal/bearing, also referred to herein as a seal/bushing. The resultant wear can lead eventually to excessive leakage and non-compliant performance. The condition also robs the valve of efficiency and overall performance and durability.

The condition results primarily because a fixed guiding bearing is typically employed to guide the pintle and facilitate proper seating of the valve head on the valve seat. Typically, the engaged length of contact between the bearing and the shaft is several times the diameter of the shaft. Because radial forces are proportional to such length of engagement, in such an arrangement high radial forces are inevitable. The driving mechanism for radial force generation is the necessary variable offset between the centerlines of the actuator and the pintle shaft, which varies as a function of the angular position of the actuator arm. Such offset is necessary to produce working force and is, therefore, unavoidable.

What is needed in the art is an improved mechanism for rotary arm-actuation of a pintle valve wherein the bearing/shaft wear known in prior art valves is eliminated.

It is a principal object of the present invention to eliminate bearing/shaft wear in arm-actuated pintle valves resulting from parasitic radial forces.

SUMMARY OF THE INVENTION

Briefly described, a rotary arm-actuated pintle valve assembly in accordance with the invention comprises a valve body having a chamber and a pintle valve seat formed in a first port in a wall of the chamber. A pintle shaft includes a valve head for mating with the valve seat to form a pintle valve for regulating flow of gas through the first port. The pintle shaft extends through a second port in a second wall of the chamber opposite the first wall. A rotary-arm actuating mechanism is mounted to the valve body outside the second port. The mechanism includes an oscillating motor mounted such that the motor shaft is substantially orthogonal to the axis of the valve through the first and second ports, and preferably is offset therefrom. The motor shaft is provided with an arm extending radially from the motor axis, the arm including a stub shaft or pin for receiving an eye on the outer end of the pintle shaft. Rotation of the motor thus causes the pintle shaft to reciprocate like an engine connecting rod, causing the valve head to move onto and away from the valve seat. The second port is large enough to permit the valve pintle to move back and forth radially within the port during actuation of the valve. The port is sealed, and an intermediate bearing provided, by a floating bearing having a double-tapered opening for receiving the pintle shaft. The floating bearing is adapted to slide back and forth in a recess in the valve body as directed by the position of the pintle shaft, all the while maintaining a pneumatic seal around the shaft. Although oscillation of the floating bearing is driven by parasitic radial forces of the shaft, the positional compliance of the bearing prevents those forces from causing bearing and/or shaft wear as in a prior art arm-actuated pintle valve. Preferably, a strut-supported radial spider element is also provided within the chamber adjacent the seat to guide the pintle shaft in mating the valve head with the valve seat.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
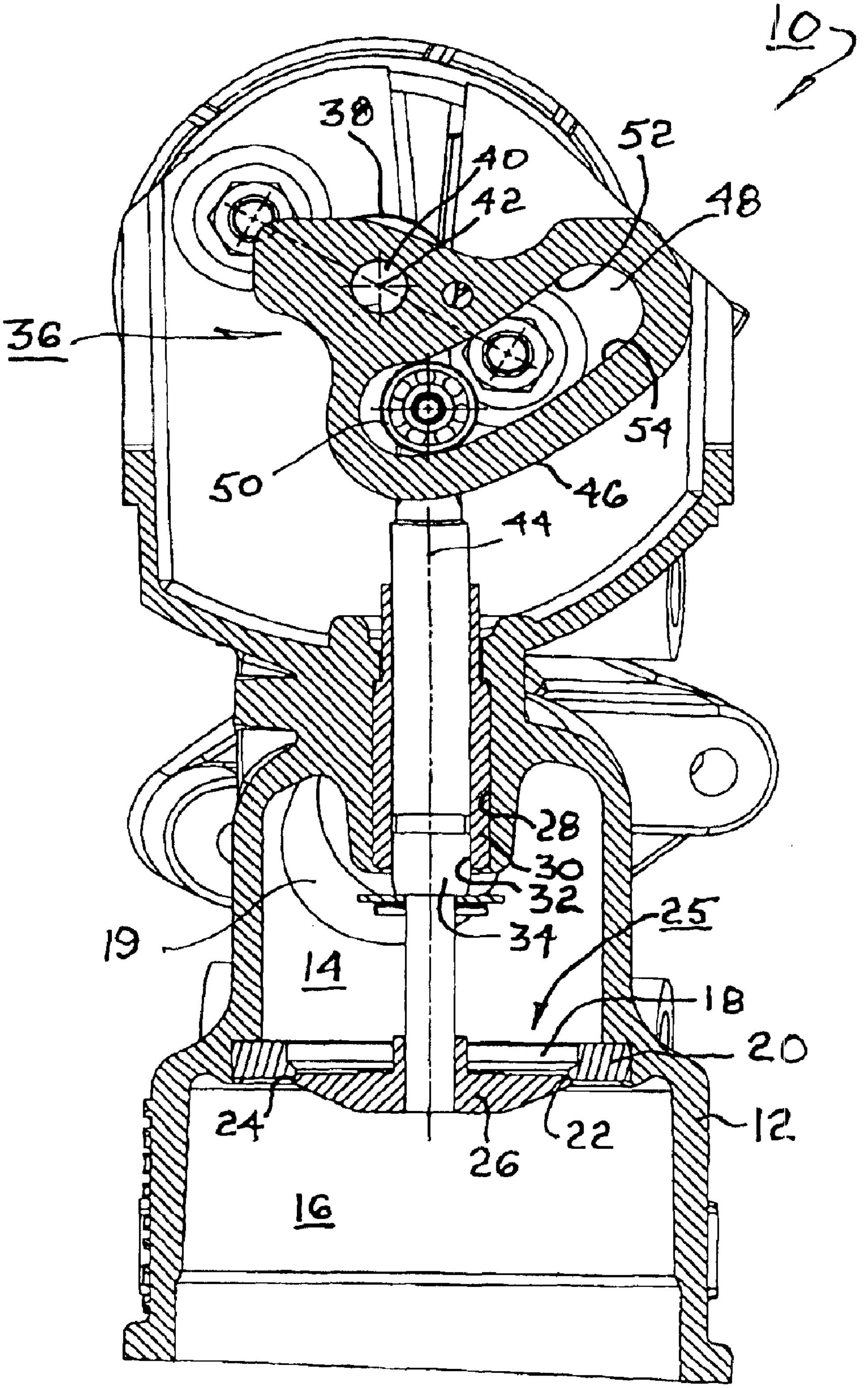
FIG. 1 (PRIOR ART)
FIG. 1 is an elevational cross-sectional view of a prior art rotary arm-actuated pintle valve.

Referring to FIG. 1, a prior art rotary arm-actuated pintle valve 10 comprises a valve body 12 having a first chamber 14 and a second chamber 16 separated by an internal port 18 through a first valve wall 17 defined by a valve seat insert 20 having a beveled seat 22 with a face for mating with a similarly-beveled face 24 on a valve head 26. A second port is defined by an axial bore 28 in valve body 12 coaxial with valve seat face 22. An elongate bushing 30 is mounted in bore 28 and has an axial bore 32 for slidingly receiving a pintle shaft 34 for actuating valve head 26. Seat 22, head 26, and pintle shaft 34 define a pintle valve 25 for regulating flow through port 18 to or from a third port 19.

Mounted on valve body 12 is a rotary-arm actuator 36 comprising a motor 38 having a shaft 40 having an axis 42 disposed substantially orthogonal to, but not intersecting, the axis 44 of shaft 34. An arm 46 is mounted on motor shaft 40 for rotation thereby about axis 42. Arm 46 includes a cam slot 48 for receiving a cam roller follower 50 mounted on pintle shaft 34. Cam slot 48 has first and second surfaces 52,54 for follower 50 to follow during rotation of arm 46 to open and close valve 25. Surfaces 52,54 have varying radii from axis 42, thereby defining cam surfaces such that rotation of arm 46 causes pintle shaft 34 to move reciprocally within bushing 32, thereby adjusting the position of face 24 with respect to seat face 22 to control flow of material through port 18. As previously noted, actuation of follower 50 by cam slot 48 creates not only an axial force vector for reciprocating pintle shaft 34 but also a parasitic radial vector that causes wear of seal/bushing 30 and shaft 34.

Figure 2:
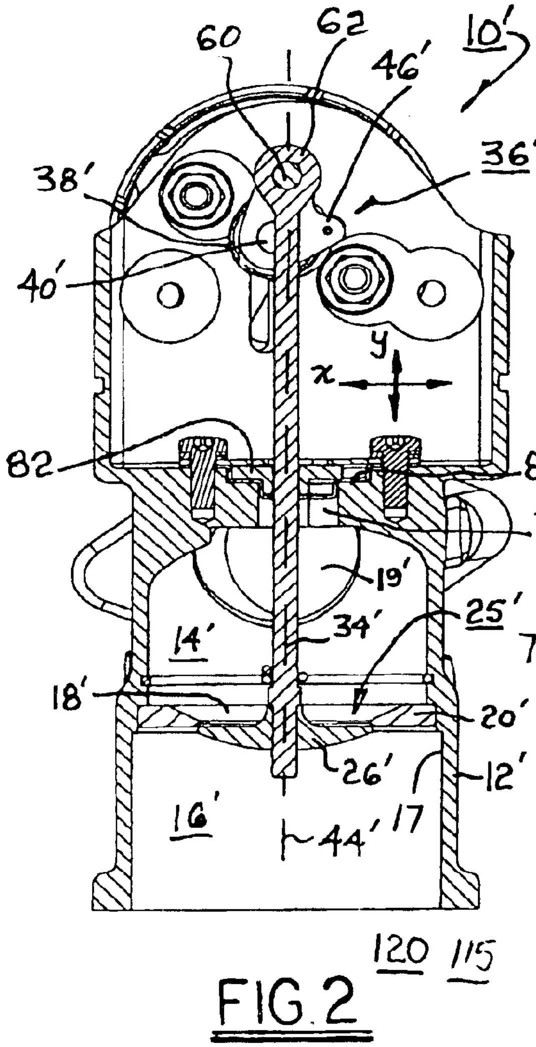
FIG. 2 is an elevational cross-sectional view of a first embodiment of an improved rotary arm-actuated pintle valve in accordance with the invention, showing the valve in a closed position, and showing a first embodiment of a floating seal/bearing.
Figure 3:
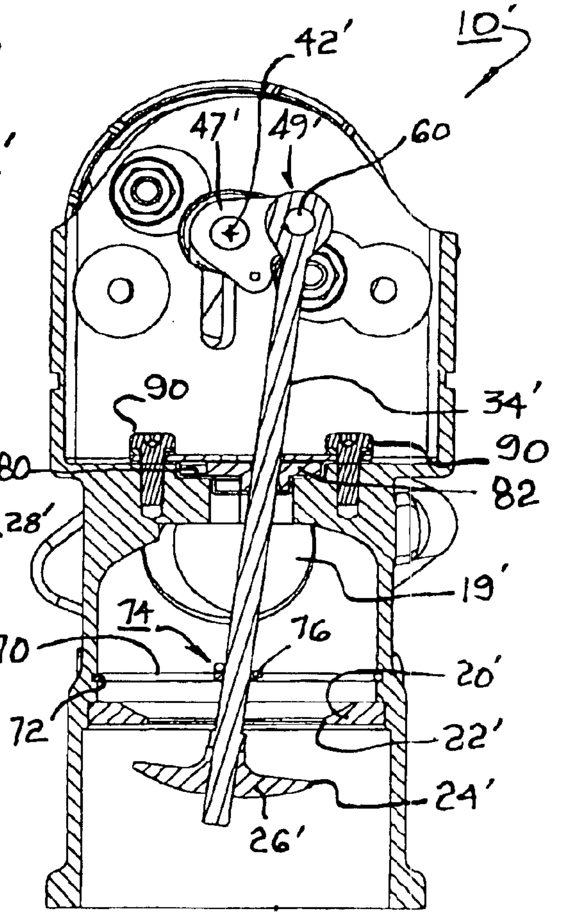
FIG. 3 is a view like that shown in FIG. 2, showing the valve in a open position.
Figure 4:
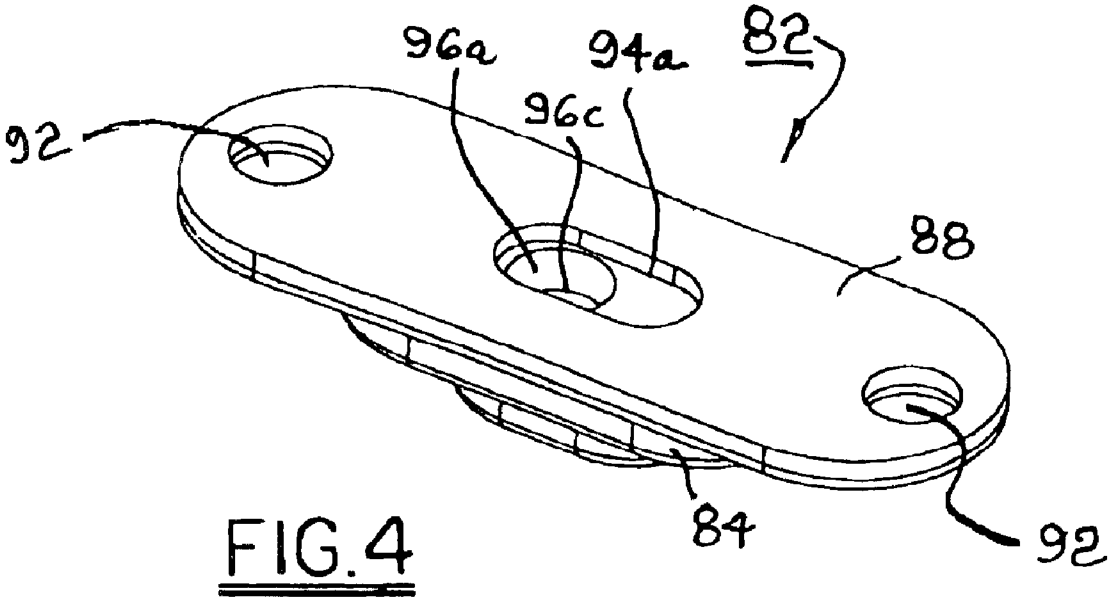
FIG. 4 is an isometric view of the first embodiment of a floating seal/bearing assembly shown in FIGS. 2 and 3.
Figure 5:
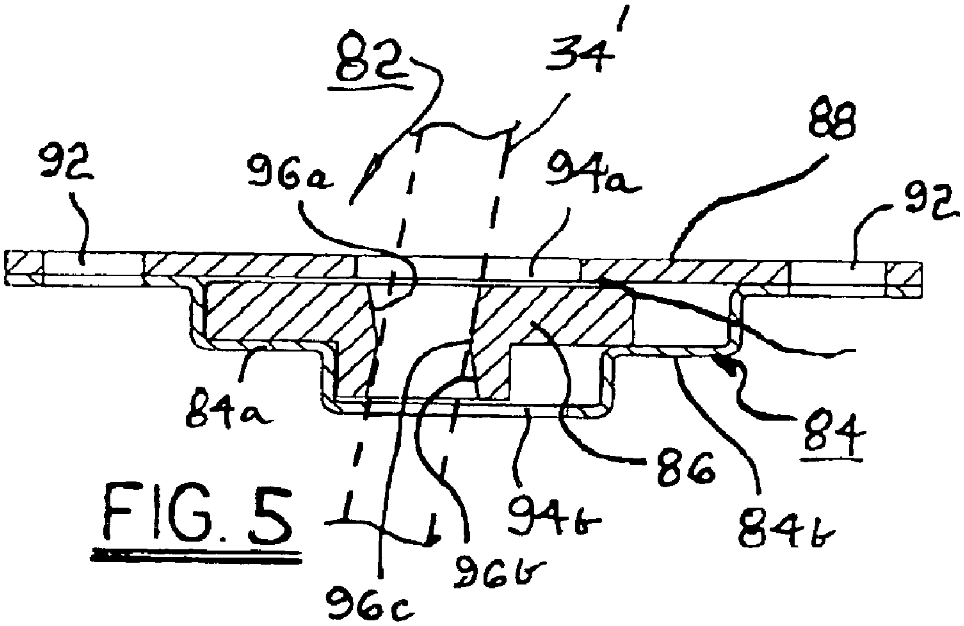
FIG. 5 is an elevational cross-sectional view of the floating seal/bearing assembly shown in FIG. 4.
Figure 6:
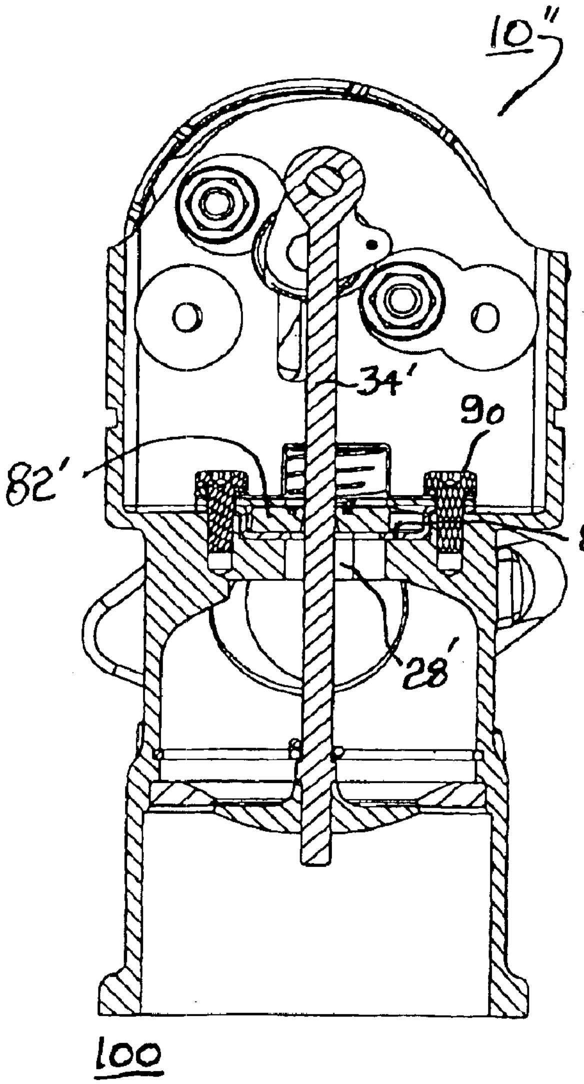
FIG. 6 is an elevational cross-sectional view of a second embodiment of an improved rotary arm-actuated pintle valve in accordance with the invention, showing the valve in a closed position, and showing a second embodiment of a floating seal/bearing.
Figure 7:
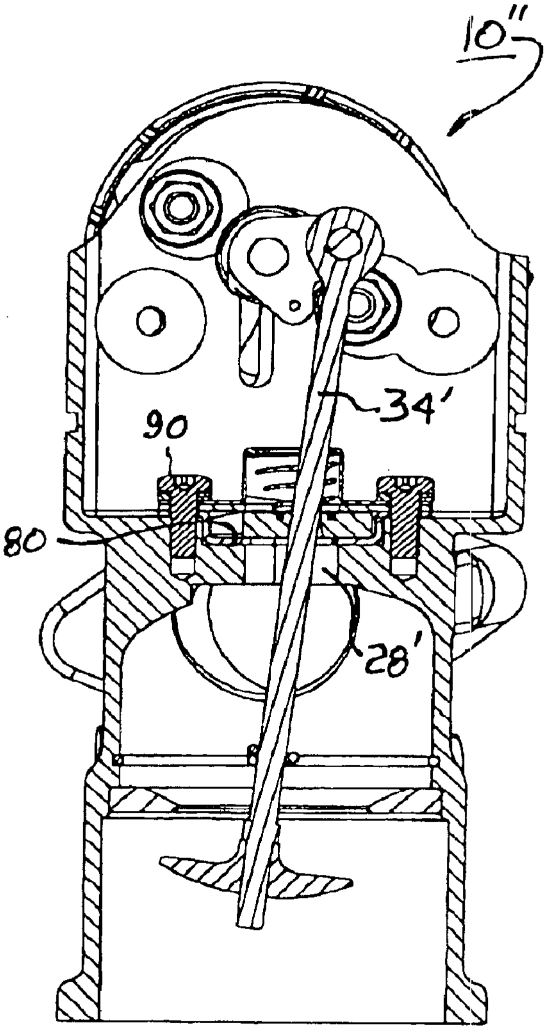
FIG. 7 is a view like that shown in FIG. 6, showing the valve in a open position.
Figure 8:
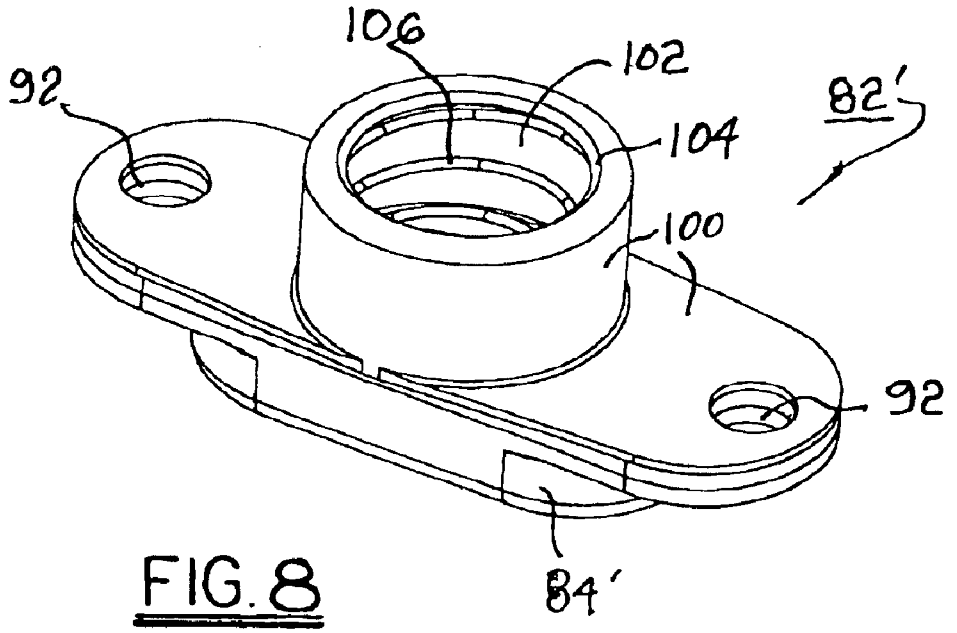
FIG. 8 is an isometric view of the second embodiment of a floating seal/bearing assembly shown in FIGS. 6 and 7.
Figure 9:
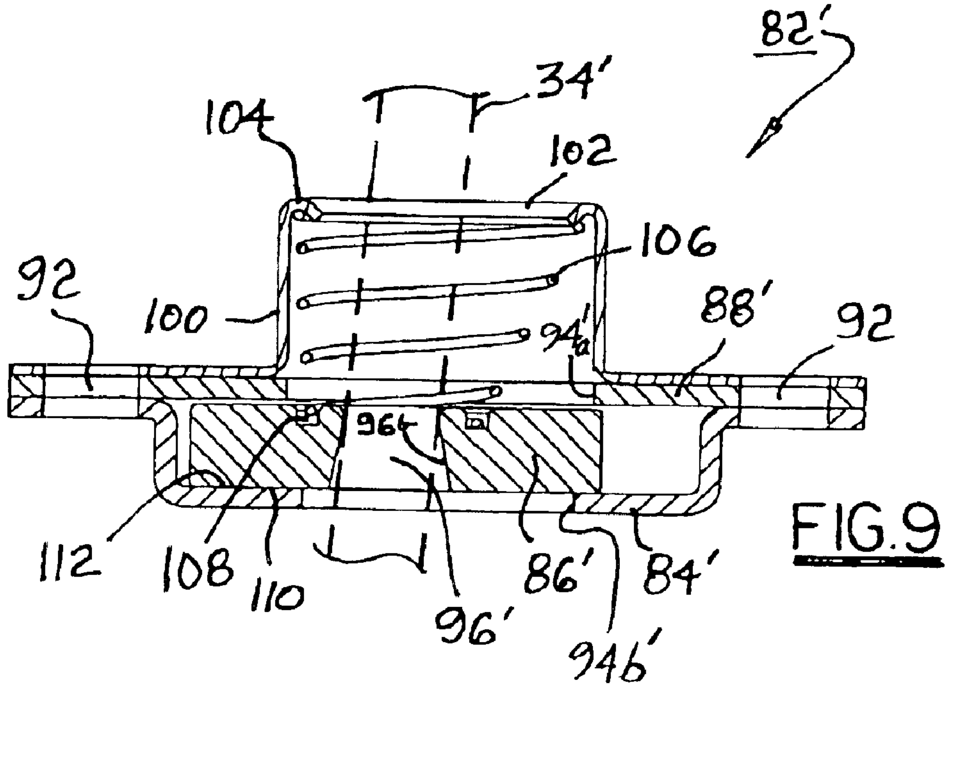
FIG. 9 is an elevational cross-sectional view of the floating seal/bearing assembly shown in FIG. 8.
Figure 10:
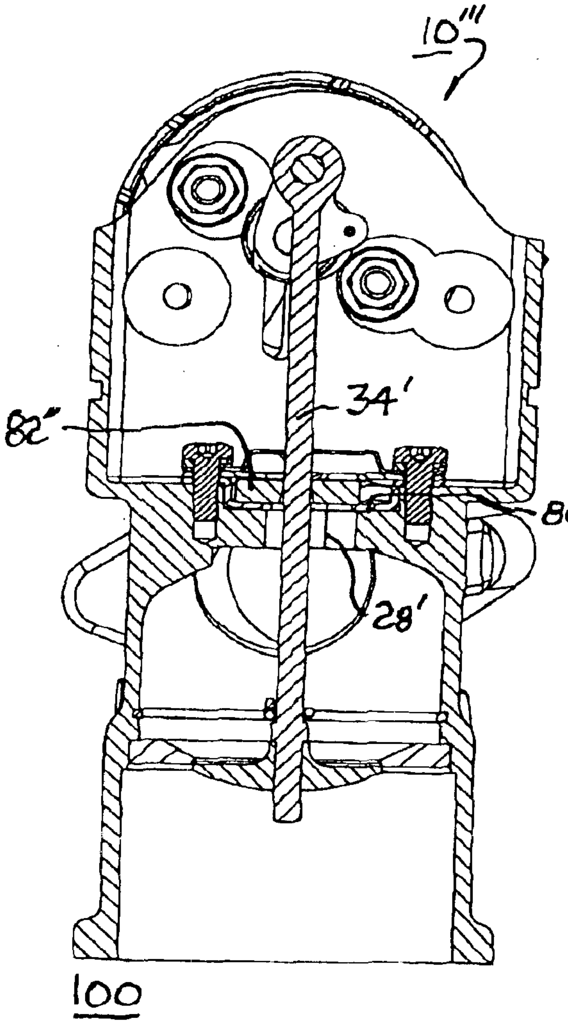
FIG. 10 is an elevational cross-sectional view of a third embodiment of an improved rotary arm-actuated pintle valve in accordance with the invention, showing the valve in a closed position, and showing a third embodiment of a floating seal/bearing.
Figure 11:
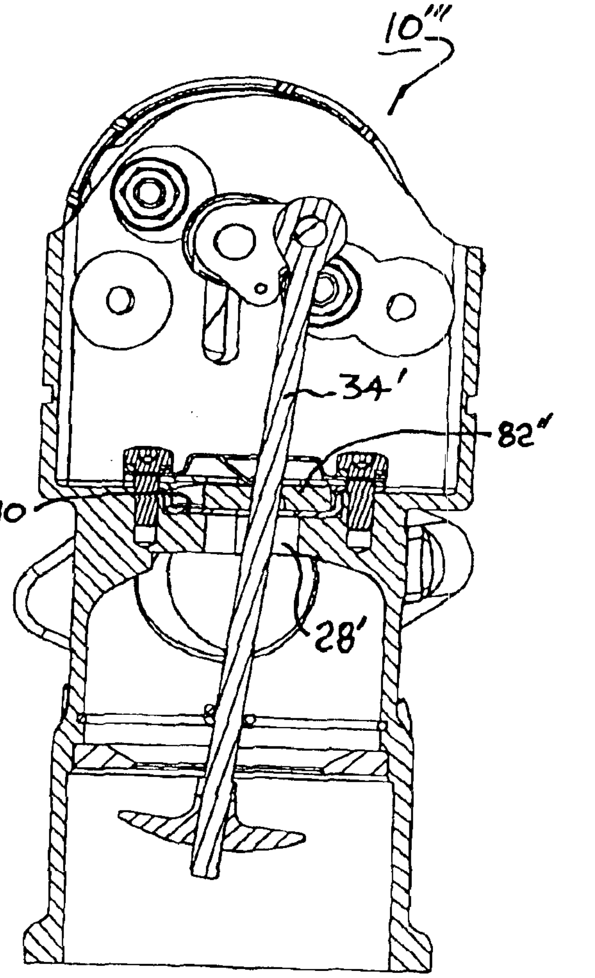
FIG. 11 is an a view like that shown in FIG. 10, showing the valve in a open position.
Figure 12:
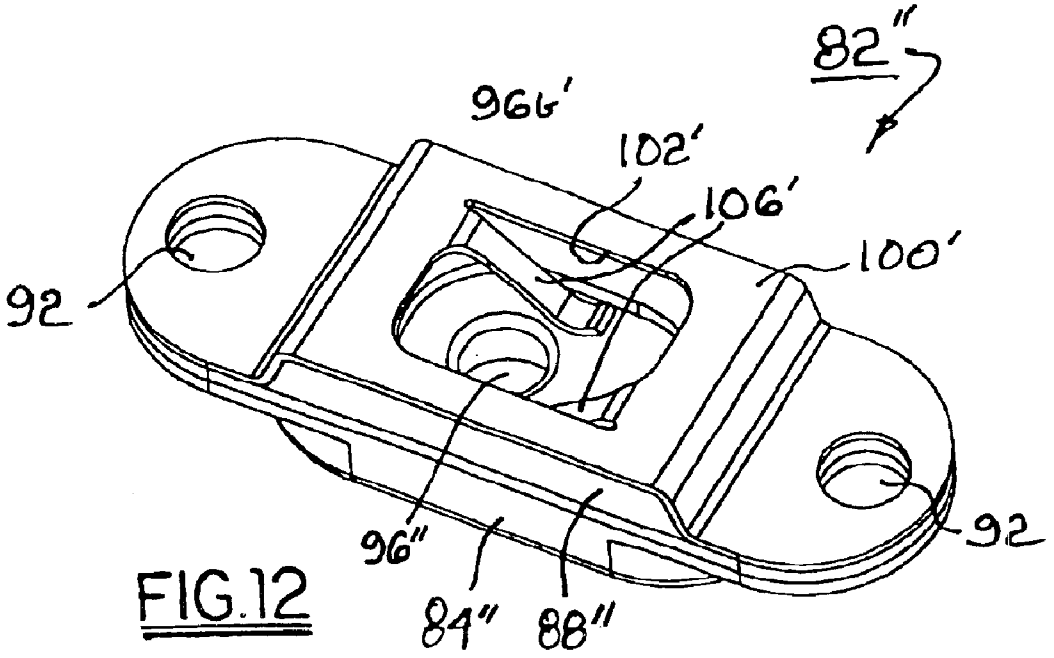
FIG. 12 is an isometric view of the third embodiment of a floating seal/bearing assembly shown in FIGS. 10 and 11.
Figure 13:
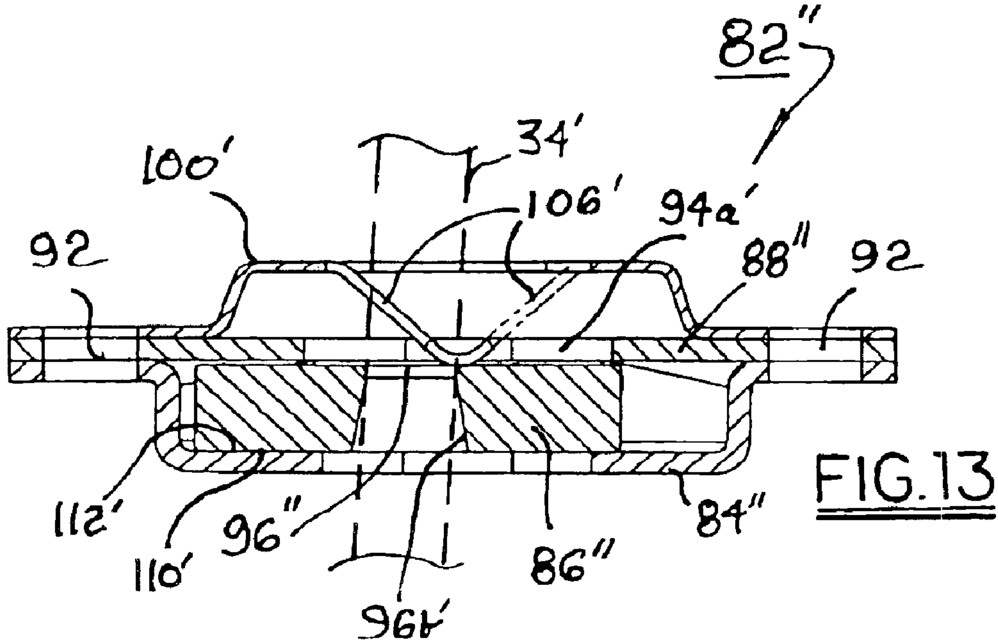
FIG. 13 is an elevational cross-sectional view of the floating seal/bearing assembly shown in FIG. 12.

Referring to FIGS. 2 and 3, a first embodiment 10' of an improved rotary arm-actuated pintle valve in accordance with the invention, showing the valve 25' in the closed (FIG. 2) and open (FIG. 3) positions, comprises a valve body 12' similar to valve body 12 and has first and second chambers 14',16' separated by a seat 20'. Pintle valve 25', analogous to prior art pintle valve 25, includes seat 20', valve head 26', and pintle shaft 34', for regulating flow between chamber 16' and port 19' through port 18' and chamber 14'.

Mounted on valve body 12' is a rotary-arm actuator means 36' comprising a motor 38' having a shaft 40' having an axis 42' disposed substantially orthogonal to the axis 44' of shaft 34'. An arm 46' is mounted at a first end 47' on motor shaft 40' for rotation thereby as a crank about axis 42'. Arm 46' includes a pin 60 disposed at a second end 49' at a radial distance from motor axis 40' for receiving an eye 62 on pintle shaft 34' such that rotation of arm 46' causes pintle shaft 34' to move reciprocally in the fashion of an engine connecting rod, thereby opening and closing pintle valve 25' to control flow of material through port 18'.

In operation, when valve embodiment 10' is fully closed, axis 44' of pintle shaft 34' is coaxial with the axis (coincident) of seat 20' and port 18' as shown in FIG. 2 such that valve head 26' is fully seated against seat 20' with seat face 22' in full contact with valve face 24'. In this position, pin 60 is at nearly, although preferably not exactly, the 12 o'clock position with respect to motor shaft 40'. Thus, motor 38' has maximum closing force of head 26' against seat 20'. To open the valve to controllably regulate the position of head 26' with respect to seat 20', motor shaft 40', and arm 46' are rotated clockwise through a desired angle to a new clock position, preferably about 2:30 o'clock when valve 25' is fully open. Further rotation of arm 46' does not generate additional flow through the valve.

Preferably, pintle shaft 34' is guided in sealing and unsealing head 26' from seat 20' by a centering element such as spider 70 disposed in a groove 72 in the wall of chamber 14'. Spider 70 includes a central opening defined by a flexible bearing 74, for example, a coil spring 76 surrounding shaft 34', and shaft 34' pivots in the spider central opening in such opening and closing of pintle valve 25'.

Because the motion of pintle shaft 34' has both x- and y-direction components in passing through second port 28', provision must be made to seal shaft 34' to prevent escape of material from chamber 14' into actuator 36'. This requires a seal capable of floating in the x direction in response to x-direction forces and may be accomplished in any of several ways, within the scope of the invention.

For the remaining disclosure and discussion, valve body 12', pintle valve 25', and actuator assembly 36' are identical, and valve body 12' is provided with a transverse channel 80 intersecting port 28' for receiving a floating seal/bearing assembly as described below.

Referring to FIGS. 2 through 5, in a first embodiment of a floating seal/bearing assembly 82 for first pintle valve assembly embodiment 10', a seal/bearing housing 84 is stepped and formed to fit snugly within port 28' and channel 80. A seal/bearing element 86 is slidable within housing 84 in the x direction as directed by x-direction forces on pintle shaft 34'. A cover plate 88 retains element 86 within housing 84, and the cover plate and housing are bolted to valve body 12' by bolts 90 through bolt holes 92. Cover plate 88 and housing 84 are each provided with an elongate slot **94*a*,94*b*, respectively, for receiving shaft 34'**.

Element 86 is formed to slide easily between cover plate 88 and housing 84, and to overlap both the left and right sides **84*a*,84*b* of housing 84 at all times. Element 86 includes a central aperture 96 for receiving shaft 34' snugly but slidably. Preferably, aperture 96 comprises opposed conic portions 96*a*,96*b* that meet at a central annular juncture 96*c*. Thus, the walls of aperture 96 are in surrounding and sealing contact with shaft 34' at all operating positions of shaft 34'**.

Referring to FIGS. 6 through 9, in a second embodiment 82' of a floating seal/bearing assembly for a second embodiment 10" of a pintle valve assembly in accordance with the invention, a seal/bearing housing 84' is formed to fit snugly across port 28' and within channel 80. A seal/bearing element 86' is slidable within housing 84' in the x direction as directed by x-direction forces on pintle shaft 34'. A cover plate 88' similar to cover plate 88 retains element 86' within housing 84'. A spring housing 100 has a central opening 102 including an inrolled rim 104 that defines an outer seat for a tapered coil spring 106. An annular groove 108 formed in the upper surface of element 86' defines an inner seat for spring 106. Spring housing 100, cover plate 88', and housing 84' are bolted to valve body 12' by bolts 90 through bolt holes 92. Cover plate 88' and housing 84' are each provided with an elongate slot **94*a'*,94*b'*, respectively, for receiving shaft 34'**.

Element 86' includes a central aperture 96' for receiving shaft 34' snugly but slidably. Preferably, aperture 96' comprises conic portion **96*b*. Thus, the walls of aperture 96' are in surrounding and sealing contact with shaft 34' at all operating positions of shaft 34'**.

Element 86' is formed to slide easily between cover plate 88' and housing 84'. Spring 106 urges the lower surface 110 of element 86' into sealing contact with the inner surface 112 of housing 84' and is sufficiently flexible to permit element 86' to sealingly slide along surface 112 in response to urging in the x direction by shaft 34'.

Referring to FIGS. 10 through 13, in a third embodiment 82" of a floating seal/bearing assembly for a third embodiment 10'" of a pintle valve assembly in accordance with the invention, a seal/bearing housing 84", which may be identical with housing 84', is formed to fit snugly across port 28' and within channel 80. A seal/bearing element 86", which may be substantially identical with element 86' minus groove 108, is slidable within housing 84" in the x direction as directed by x-direction forces on pintle shaft 34'. A cover plate 88" which may be identical with cover plate 88' retains element 86" within housing 84". A spring housing 100' has a central opening 102' including first and second formed spring tabs defining first and second springs 106'. Springs 106' extend through opening 94*a*' in cover plate 88" to bear directly on element 86". Spring housing 100', cover plate 88", and housing 84" are bolted to valve body 12' by bolts 90 through bolt holes 92.

Element 86" includes a central aperture 96" for receiving shaft 34' snugly but slidably. Preferably, aperture 96" comprises conic portion 96*b*'. Thus, the walls of aperture 96" are in surrounding and sealing contact with shaft 34' at all operating positions of shaft 34'.

Element 86" is formed to slide easily between cover plate 88" and housing 84". Springs 106' urge the lower surface 110' of element 86" into sealing contact with the inner surface 112' of housing 84", permitting element 86" to sealingly slide along surface 112' in response to urging in the x direction by shaft 34'.

Pintle valve assemblies 10',10", and 10'" are especially suited to use in motor vehicles 115 as an exhaust gas recirculation (EGR) valve for an internal combustion engine 120 in known fashion.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A pintle valve system, comprising:

a) a valve body including at least one chamber;

b) a first port in said body defined by a valve seat in a wall of said chamber;

c) a second port in said body;

d) a pintle shaft extending through said second port and supporting a valve head for variably mating with said valve seat to define a pintle valve for controlling flow of material through said chamber and said first port;

e) an actuator disposed on said valve body and including an oscillatory motor having a motor shaft, and a lever arm attached at a first end to said motor shaft and at a second end to said pintle shaft such that oscillatory motion of said motor shaft is translated into reciprocating motion of said pintle shaft and valve head to variably open and close said pintle valve; and f) a floating seal/bearing disposed across said second port and receivable of said pintle shaft therethrough for permitting free motion of said pintle shaft in both radial and axial vectors during said reciprocating motion thereof while also preventing escape of material from said chamber through said second port.

2. A valve system in accordance with claim 1 further comprising a centering element disposed within said chamber for centering said pintle shaft and valve head with respect to said valve seat.

3. A valve system in accordance with claim 1 wherein said valve body includes a channel transverse of said second port for receiving said floating seal/bearing.

4. A valve system in accordance with claim 1 wherein said floating seal/bearing comprises:

a) a housing;

b) a seal/bearing element disposed in said housing; and c) a cover plate for retaining said seal/bearing element in said housing;

wherein said housing and said cover plate are each provided with a central opening for passage of said pintle shaft therethrough; and wherein said seal/bearing element is provided with a central opening aligned with said housing and cover plate central openings, said seal/bearing element central opening being so configured that said pintle shaft is sealed by contact with the walls of said seal/bearing element central opening during said reciprocating motion thereof; and wherein said seal/bearing element is freely slidable within said housing in a direction transverse of said port as may be required to follow said reciprocating motion of said pintle shaft.

5. A valve system in accordance with claim 4 wherein said seal/bearing element central opening comprises at least one conic section.

6. A valve system in accordance with claim 4 wherein said floating seal/bearing means further comprises:

a) spring retainer disposed against said cover plate; and b) a spring disposed within said spring retainer and positioned to urge said seal/bearing element into sealing sliding contact with an internal surface of said housing.

7. A valve system in accordance with claim 6 wherein said spring comprises a coil spring.

8. A valve system in accordance with claim 6 wherein said spring comprises at least one leaf spring formed from said spring retainer.

9. A valve system in accordance with claim 1 wherein said pintle valve system is disposed in a vehicle for controlling flow of exhaust gas between an exhaust gas system and an intake air system of an internal combustion engine powering said vehicle.

10. An exhaust gas recirculation valve for controlling flow of exhaust gas between an exhaust gas system and an intake air system of an internal combustion engine, comprising:

a) a valve body including at least one chamber;

b) a first port in said body defined by a valve seat in a wall of said chamber;

c) a second port in said body;

d) a pintle shaft extending through said second port and supporting a valve head for variably mating with said valve seat to define a pintle valve for controlling flow of exhaust gas through said chamber and said first port;

e) an actuator disposed on said valve body and including an oscillatory motor having a motor shaft, and a lever arm attached at a first end to said motor shaft and at a second end to said pintle shaft such that oscillatory motion of said motor shaft is translated into reciprocating motion of said pintle shaft and valve head to variably open and close said pintle valve; and f) a floating seal/bearing disposed across said second port and receivable of said pintle shaft therethrough for permitting free motion of said pintle shaft in both radial and axial vectors during said reciprocating motion thereof while also preventing escape of exhaust gas from said chamber through said second port.

11. An internal combustion engine, comprising an exhaust gas recirculation valve for controlling flow of exhaust gas between an exhaust gas system and an intake air system of said engine, said exhaust gas recirculation valve including, a valve body including at least one chamber, a first port in said body defined by a valve seat in a wall of said chamber, a second port in said body, a pintle shaft extending through said second port and supporting a valve head for variably mating with said valve seat to define a pintle valve for controlling flow of exhaust gas through said chamber and said first port, an actuator disposed on said valve body and including an oscillatory motor having a motor shaft, and a lever arm attached at a first end to said motor shaft and at a second end to said pintle shaft such that oscillatory motion of said motor shaft is translated into reciprocating motion of said pintle shaft and valve head to variably open and close said pintle valve, and a floating seal/bearing disposed across said second port and receivable of said pintle shaft therethrough for permitting free motion of said pintle shaft in both radial and axial vectors during said reciprocating motion thereof while also preventing escape of exhaust gas from said chamber through said second port.

* * * * *